(12) United States Patent
Kim et al.

(10) Patent No.: US 7,783,329 B2
(45) Date of Patent: Aug. 24, 2010

(54) METHOD AND SYSTEM FOR CONTROLLING SLEEP MODE TO SAVE POWER IN A WIRELESS MESH NETWORK

(75) Inventors: Jae-Hoon Kim, Seoul (KR); Young-Gon Choi, Suwon-si (KR)

(73) Assignee: Samsung Electronics, Co., Ltd., Suwon-si (KR)

( * ) Notice: Subject to any disclaimer, the term of this patent is extended or adjusted under 35 U.S.C. 154(b) by 355 days.

(21) Appl. No.: 11/588,304

(22) Filed: Oct. 27, 2006

(65) Prior Publication Data
US 2007/0281641 A1 Dec. 6, 2007

(30) Foreign Application Priority Data
Jun. 5, 2006 (KR) .................. 10-2006-0050395

(51) Int. Cl.
*H04B 7/00* (2006.01)
*H04B 7/185* (2006.01)

(52) U.S. Cl. .................. 455/574; 370/318; 455/522

(58) Field of Classification Search ................. 370/338, 370/310, 311, 329, 349, 468, 347, 318, 344; 455/414.1, 343.1, 458, 522, 456.1
See application file for complete search history.

(56) References Cited

U.S. PATENT DOCUMENTS

| 2005/0009578 A1* | 1/2005 | Liu ......................... 455/574 |
| 2005/0152324 A1* | 7/2005 | Benveniste .................. 370/338 |
| 2006/0045051 A1* | 3/2006 | Floros et al. ................. 370/332 |
| 2006/0052088 A1* | 3/2006 | Pavon et al. ............. 455/414.1 |

* cited by examiner

*Primary Examiner*—George Eng
*Assistant Examiner*—Nizar Sivji
(74) *Attorney, Agent, or Firm*—NSIP Law (57) ABSTRACT

A method and system for eliminating inefficiency caused by active-sleep mode switching in power saving through a sleep mode in a wireless mesh network are provided. The sleep mode is controlled using a virtual Transmission Opportunity (vTXOP) according to TXOP information of a one-hop neighbor node. The sleep mode control takes into account a wireless mesh network environment and leads to power saving.

13 Claims, 6 Drawing Sheets

METHOD AND SYSTEM FOR CONTROLLING SLEEP MODE TO SAVE POWER IN A WIRELESS MESH NETWORK

CROSS-REFERENCE TO RELATED APPLICATIONS

This application claims the benefit under 35 U.S.C. §119(a) of Korean Patent Application No. 2006-50395, filed Jun. 5, 2006 in the Korean Intellectual Property Office, the entire disclosure of which is hereby incorporated by reference.

BACKGROUND OF THE INVENTION

1. Field of the Invention:

The present invention relates generally to a method and system for controlling a sleep mode to save power in a wireless mesh network. More particularly, the present invention relates to a method and system for controlling a sleep mode using a Transmission Opportunity (TXOP) map in order to save power.

2. Description of the Related Art:

It is expected that a wireless mesh network will present a new paradigm for the wireless network market which is ubiquitous in the modern era. A wireless mesh network is a kind of multi-hop ad-hoc network that connects fixed nodes to mobile nodes by radio links to support high-speed Internet in urban or other particular areas.

The wireless mesh network is designed to overcome the shortcoming of a Wireless Local Area Network (WLAN) such as Hot-Spot, local coverage and limited network capacity by adopting the mesh network configuration of a wired network for a wireless network and thus achieving network reliability, expandability, and mobility. Besides, the features of the wireless mesh network including self-configuration, self-healing, wide bandwidth, and large coverage relative to a conventional WLAN structure make it possible to utilize the wireless mesh network in a variety of fields such as an intelligent traffic information system, future-generation wireless communications, and public safety.

Many techniques have been proposed to save power in the wireless mesh network. Among them, Institute of Electrical and Electronics Engineers (IEEE) 802.11e defines a sleep mode during a service period for saving power. However, since this power saving technology suffers power consumption in transition between normal node and sleep mode, power saving resulting from the use of the sleep mode is insufficient.

Accordingly, there is a need for an improved system and method for controlling a sleep mode to save power in a wireless mesh network.

SUMMARY OF THE INVENTION

Exemplary embodiments of the present invention address at least the above problems and/or disadvantages and provide at least the advantages below. Accordingly, exemplary embodiments of the present invention provide a method and system for controlling a sleep mode according to a wireless mesh network environment by setting a virtual TXOP (vTXOP) using TXOP map information of a one-hop neighbor node, in order to save power.

According to one exemplary aspect of the present invention, in a method of controlling a sleep mode to save power in a wireless mesh network, individual TXOPs are determined by listening to an ADDT signal during communications between nodes. Individual TXOPs are detected within an SI among the determined individual TXOPs and a virtual TXOP is set, which starts from the start point of the SI and ends at the end of the last of the detected individuals TXOPs. It is determined whether to enter into the sleep mode by comparing the virtual TXOP with an SI-based value.

According to another exemplary aspect of the present invention, in a system for controlling a sleep mode to save power in a wireless mesh network, an individual TXOP decider determines individual TXOPs by listening to an ADDT signal during communication between nodes. An individual TXOP detector detects individual TXOPs within an SI among the determined individual TXOPs. A virtual TXOP setter sets a virtual TXOP starting from the start point of the SI and ending at the end of the last of the detected individual TXOPs. A sleep mode entry decider determines whether to enter into the sleep mode by comparing the virtual TXOP with an SI-based value.

BRIEF DESCRIPTION OF THE DRAWINGS

The above and other objects, features and advantages of the present invention will become more apparent from the following detailed description when taken in conjunction with the accompanying drawings in which.

Throughout the drawings, the same drawing reference numerals will be understood to refer to the same elements, features, and structures.

DETAILED DESCRIPTION OF EXEMPLARY EMBODIMENTS

The matters defined in the description such as a detailed construction and elements are provided to assist in a comprehensive understanding of the embodiments of the invention and are merely exemplary. Accordingly, those of ordinary skill in the art will recognize that various changes and modification of the embodiments described herein can be made without departing from the scope and spirit of the invention. Also, descriptions of well-known functions and constructions are omitted for clarity and conciseness.

Exemplary embodiments of the present invention provide a system and method for controlling a sleep mode in a wireless mesh network, in which individual TXOPs (TXOPi) are determined by listening to ad Add Traffic steam (ADDT) during communication between nodes, individual TXOPs that fall within a Service Interval (SI) are detected among the individual TXOPs, a virtual TXOP starting at the start of the SI and ending at the end of the last individual TXOP is set and compared with an SI-based value, and it is determined whether to enter into the sleep mode according to the comparison result.

Figure 1:
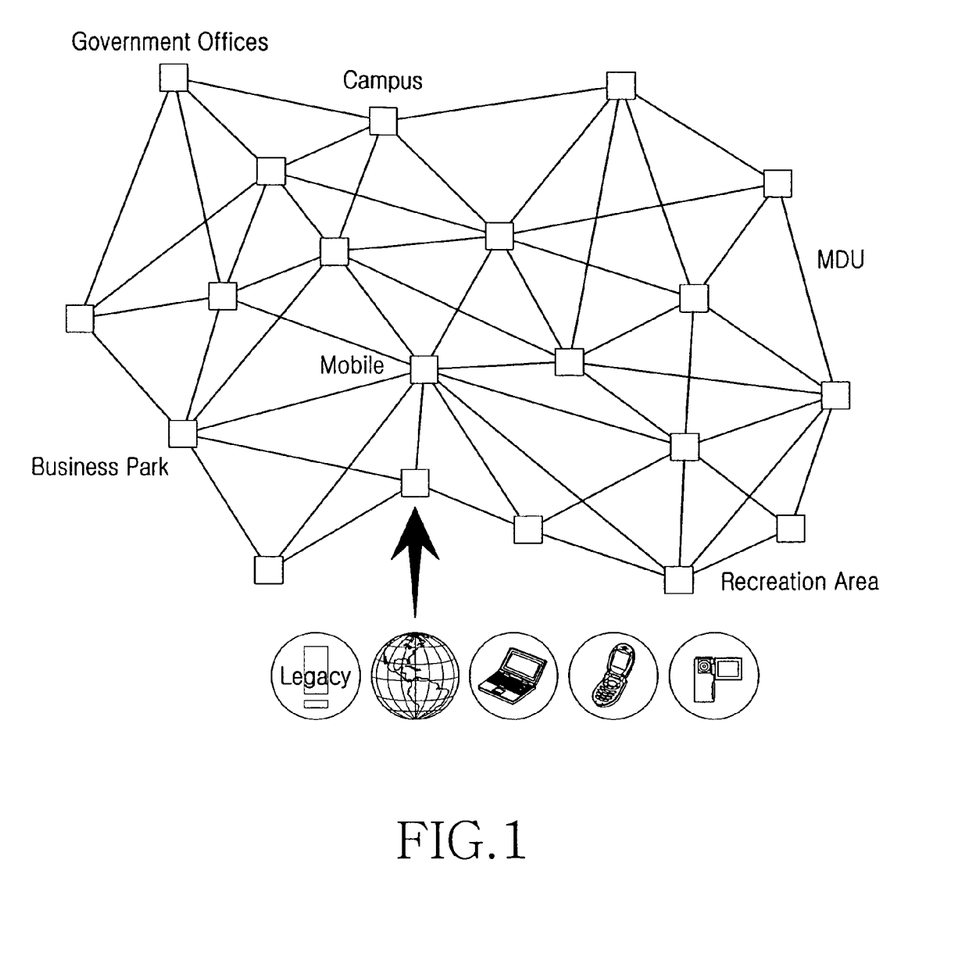
FIG. 1 illustrates a configuration of a wireless mesh network.
Figure 2:
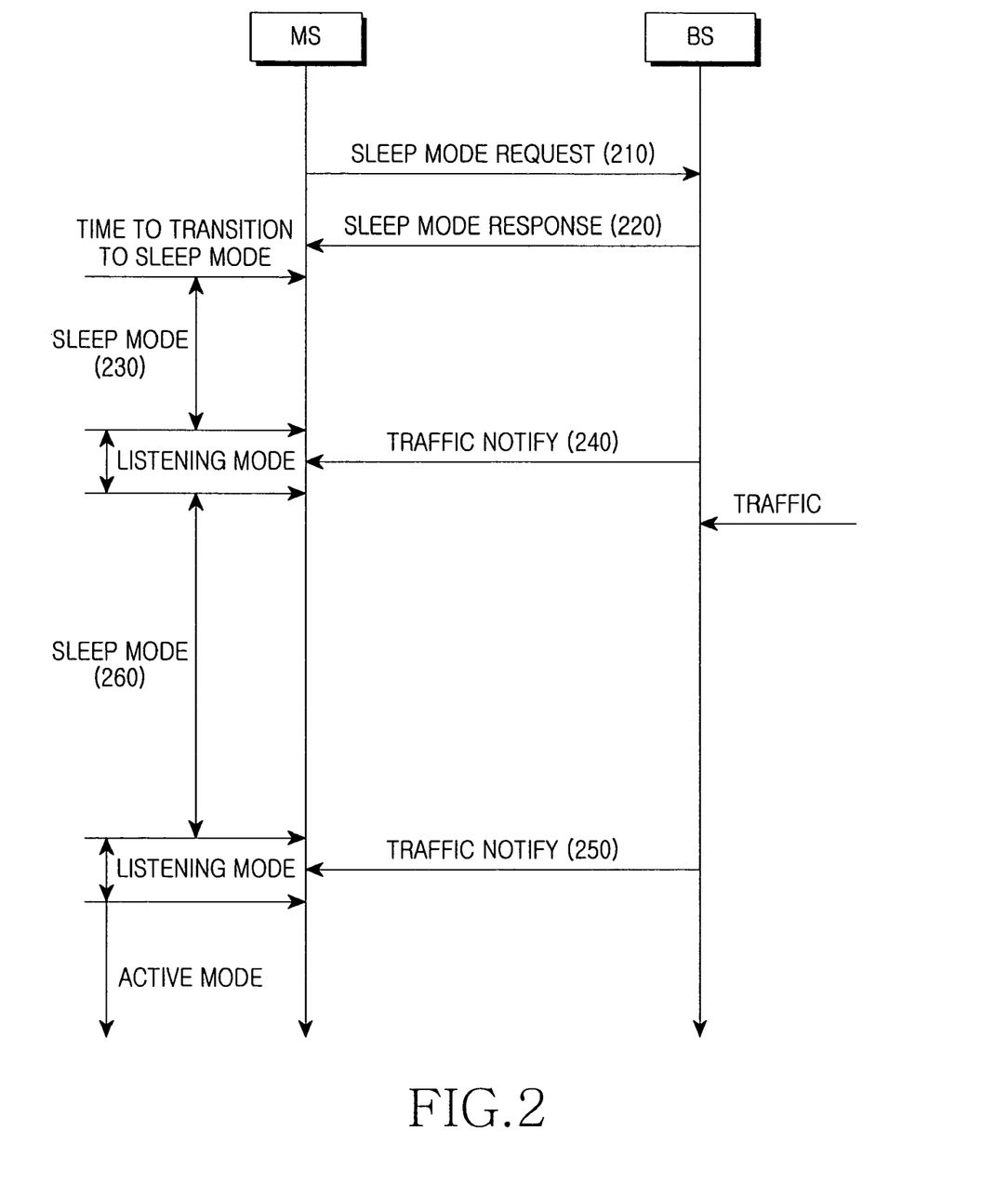
FIG. 2 is a diagram illustrating an exemplary signal flow for setting a IEEE 802.11e sleep mode in a wireless mesh network.

FIG. 1 illustrates the basic concept of a wireless mesh network to which an exemplary embodiment of the present invention is applied, and FIG. 2 is a diagram. illustrating an exemplary signal flow for implementing the sleep mode in the wireless mesh network.

Referring to FIG. 2, a Mobile Station (MS) sends a sleep request message to a Base Station (BS) in the wireless mesh network in step 210, and the BS replies with a sleep response message in step 220. Upon receipt of the sleep response message, the MS enters into the sleep mode in step 230. Once the MS enters into the sleep mode, unless traffic is generated as in steps 240 and/or 250, it lengthens the sleep mode in step 260, determining it is highly probable that no traffic will be created in the next interval. Thus power consumption is minimized.

Figure 3:
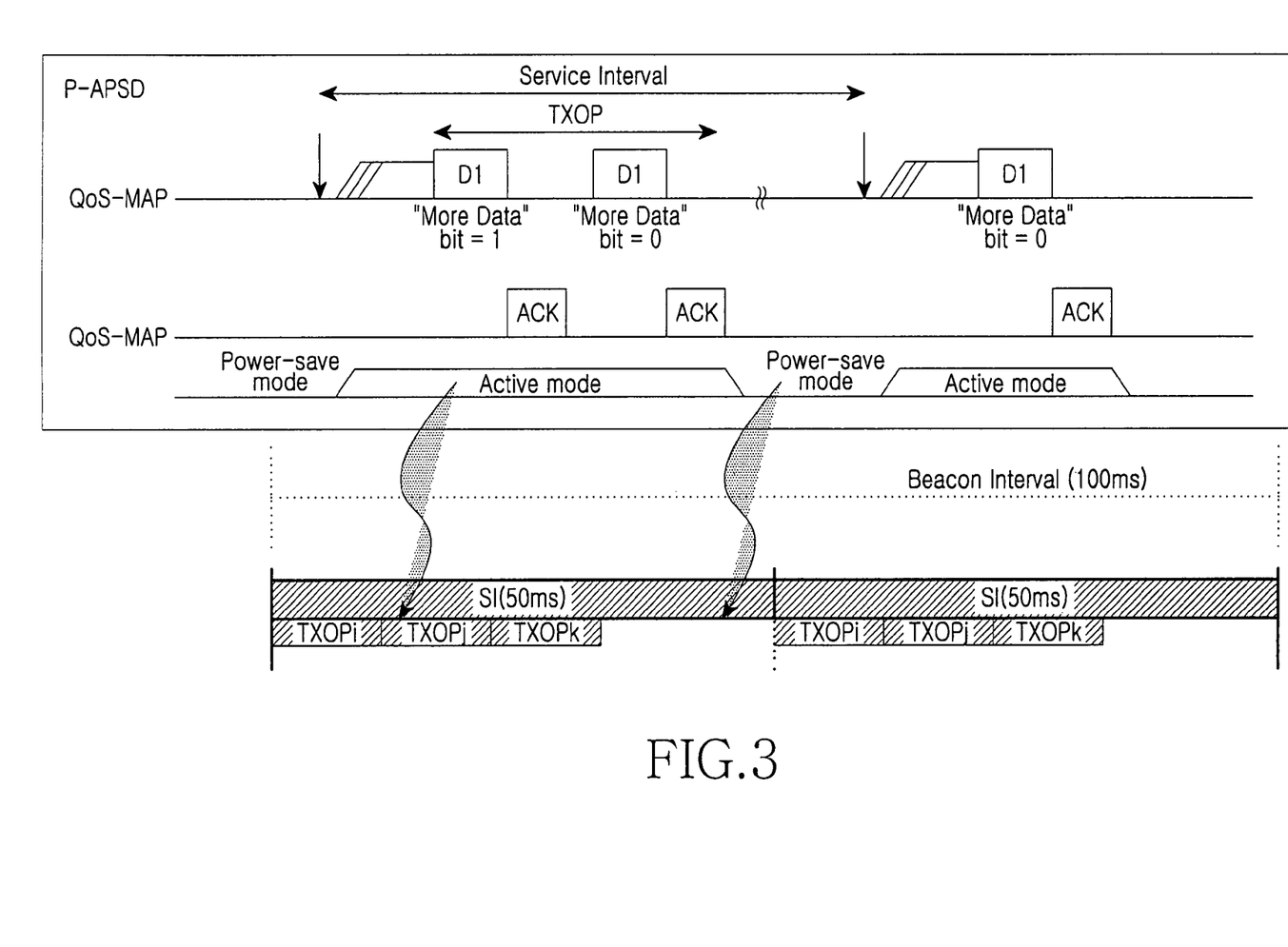
FIG. 3 illustrates Automatic Power Save Mode (APSD) defined in IEEE 802.11e.

FIG. 3 illustrates APSD defined by IEEE 802.11e. According to the APSD scheme, individual TXOPs are decided through negotiations with a neighbor node. During negotiations with the neighbor Mesh Point (MP), the sleep mode is set according to the presence or absence of individuals TXOPs within an SI set to the minimum divisor of a beacon interval, to thereby save power. Yet, in application to IEEE 802.11s, there is no specified mechanism for adaptively setting an active mode and a sleep mode for efficient power saving in the wireless mesh network because of the relationship between the size of the SI and TXOPs. The IEEE standards and task groups within the IEEE 802.11 working group are hereby incorporated by reference.

Hence, when the sleep mode is required between TXOPi and TXOPk, switching between the active mode and the sleep mode occurs repeatedly. The sleep mode is transitioned to for the remaining SI after the last TXOP (in other words, TXOPk) irrespective of the size of the remaining SI, and even though TXOPi is much shorter than the SI, the active mode is set and then transitioned to the sleep mode.

FIGS. 4A, 4B and 4C illustrate an operation for setting TXOP maps according to an exemplary embodiment of the present invention. The TXOP map setting is a process of setting a virtual TXOP (vTXOP) under some circumstances. Virtual TXOPs can be classified into a distributed vTXOP (FIG. 4A), a long vTXOP (FIG. 4B), and a single vTXOP (FIG. 4C).

The distributed vTXOP has one or more sleep modes among a plurality of TXOPi (i=1,2, ..., n). If not TXOP (In other words, TXOPm) exists after TXOPk, the last TXOP is TXOPk. A plurality of sleep modes or TXOPs may exist between the first TXOP, TXOPi and the last TXOP, TXOPm. The long vTXOP has one or more successive individual TXOPs, whereas the single vTXOP has only one TXOP. While the TXOPs and the sleep modes are shown to be equal in duration, it is just for illustrative purposes. Therefore, their durations may vary according to services.

According to the TXOP maps, a vTXOP starts from the start of an SI and ends at the end of the last TXOP in the SI. The reason for setting the start point of the vTXOP to the start of the Si is to monitor ADDT exchange.

An ADDT is used to determine individual TXOPs. The ADDT includes Traffic Specification (TSPEC) with nominal values such as link rate, data rate, and duration. According to an exemplary embodiment of the present invention, the durations of individual TXOPs are set using an ADDT-request and an ADDT-Reply, and a TXOP map is set to define a vTXOP using the individual TXOPs. The ADDT-Request and the ADDT-Reply are broadcast or unicast to nodes in the wireless mesh network, When the ADDT information is multicast, it is listened to, and when the ADDT information is unicast, it is overheard, for setting a TXOP MAP. The ADDT listening or overhearing is a technique for acquiring information a modification to software without additional hardware.

Figure 4:
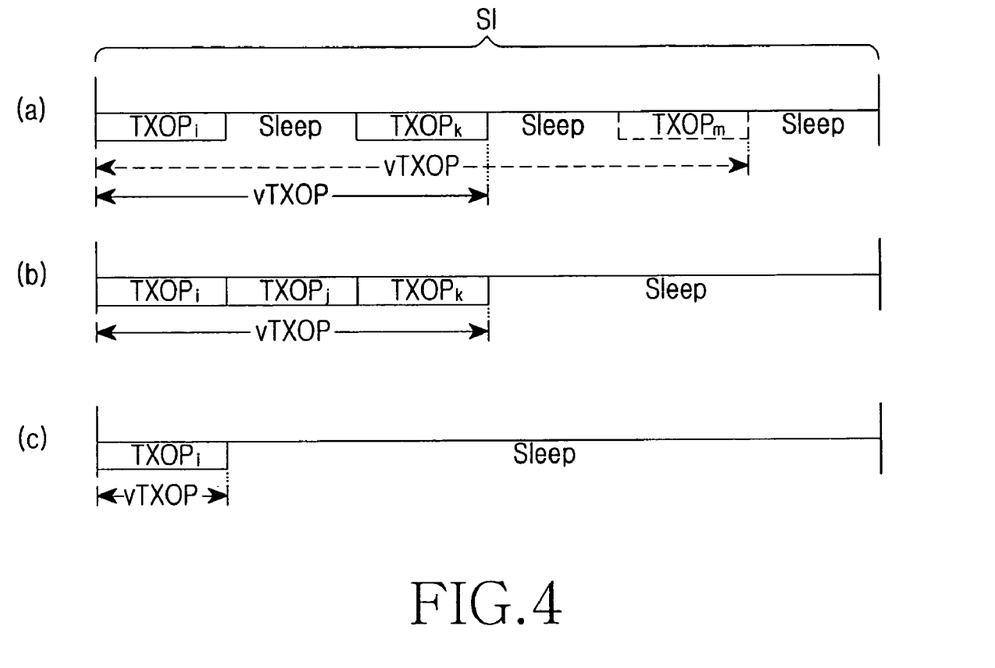
FIGS. 4A, 4B and 4C illustrate TXOP maps according to exemplary embodiments of the present invention.
Figure 5:
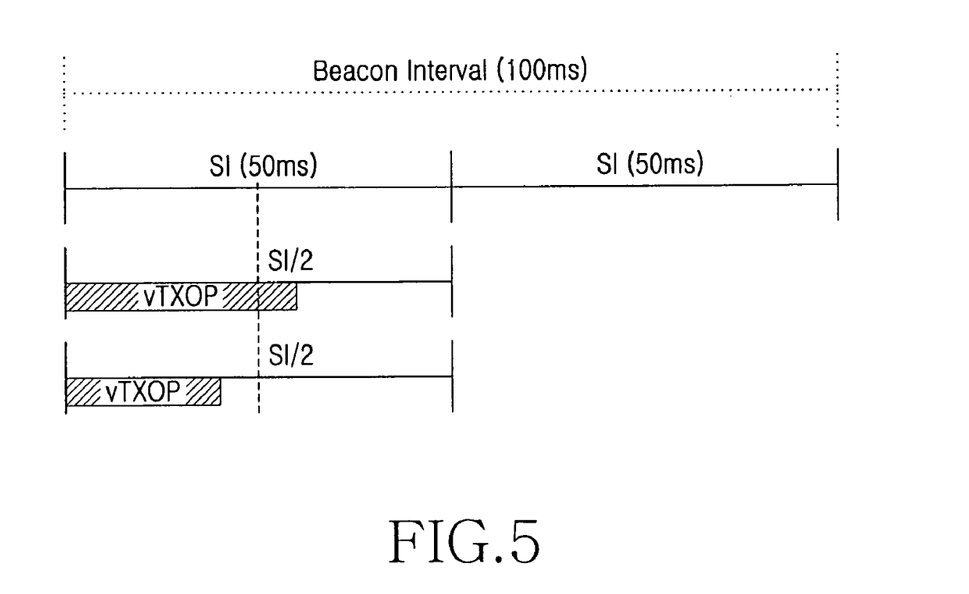
FIG. 5 illustrates an exemplary operation for determination whether to enter into the sleep mode according to TXOP maps illustrated in FIG. 4.

FIG. 5 illustrates an operation for comparing vTXOPs set in FIG. 4 with an SI-based value. There can be the following two comparison examples: one is that a vTXOP is equal to or longer than SI/2 (vTXOP=SI/2) and the other is that vTXOP is shorter than SI/2 and the SI equal to or longer than a beacon-based value (for example, beacon interval/4) (vTXOP<SI/2, SI=beacon interval/4). When vTXOP=SI/2, the sleep mode is not entered into, and when vTXOP<SI/2, SI=beacon interval/4, the sleep mode is entered into, thereby reducing power consumption arising from mode transitioning. The SI-based value is set to SI/2 because it is preferable not to enter into the sleep mode when the vTXOP occupies a half or more of the SI. When entering into the active mode, the relationship between the SI and the beacon interval is considered because in the case of an SI much shorter than a beacon interval (for example SI<beacon interval/4), a service time is too short and thus continuing the active mode rather than transitioning to the sleep mode is preferable in terms of power saving. A feature of the above operation lies in that power is saved in active-sleep mode switching and power consumption involved in entering into the sleep mode and then transitioning to the active mode a very short time later in an SI is reduced. The SI-based value and the beacon-based value may vary.

Figure 6:
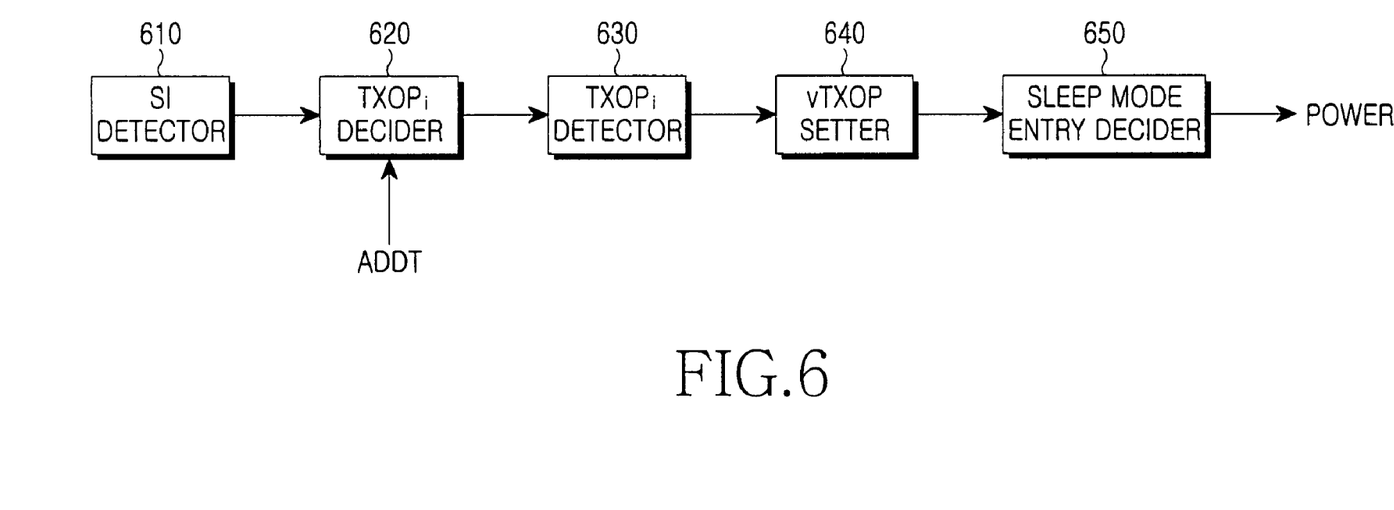
FIG. 6 is a block diagram of a system for controlling power saving using a TXOP map according to an exemplary embodiment of the present invention.

FIG. 6 is block diagram of a system for controlling power saving using a TXOP map according to an exemplary embodiment of the present invention. This system is an enhancement from the conventional technology. In the conventional technology, when the sleep mode is required, the sleep mode is entered into irrespective of the type of a vTXOP and the size of the remaining SI after the vTXOP (in other words, SI-TXOP). Therefore, power saving is not efficient due to active-sleep mode transitioning. In contrast, in the present invention, it is determined whether to enter into the sleep mode according to a TXOP defining a vTXOP type and the relation between the vTXOP and the SI. Thus, power saving efficiency is increased.

Referring to FIG. 6, the power saving controlling system includes an SI detector 610, a TXOPi (individual TXOP) decider 620 for determining individual TXOPs by listening to an ADDT signal as described before with reference to FIG. 4, and a TXOPi detector 630 for detecting individual TXOPs within an SI. The SI detector 610 detects the start point of a service by a method which is beyond the scope of the present invention and not described herein.

A vTXOP setter 640 sets a vTXOP with the individual TXOPs, the vTXOP starting from the start of the SI and ending at the end of the last individual TXOP. As described before, the start of the vTXOP is set to the start point of the SI in order to monitor ADDT exchange. A sleep mode entry decider 650 decides whether to enter into the sleep mode by comparing the vTXOP with an SI-based value as described before with reference to FIG. 5.

Figure 7:
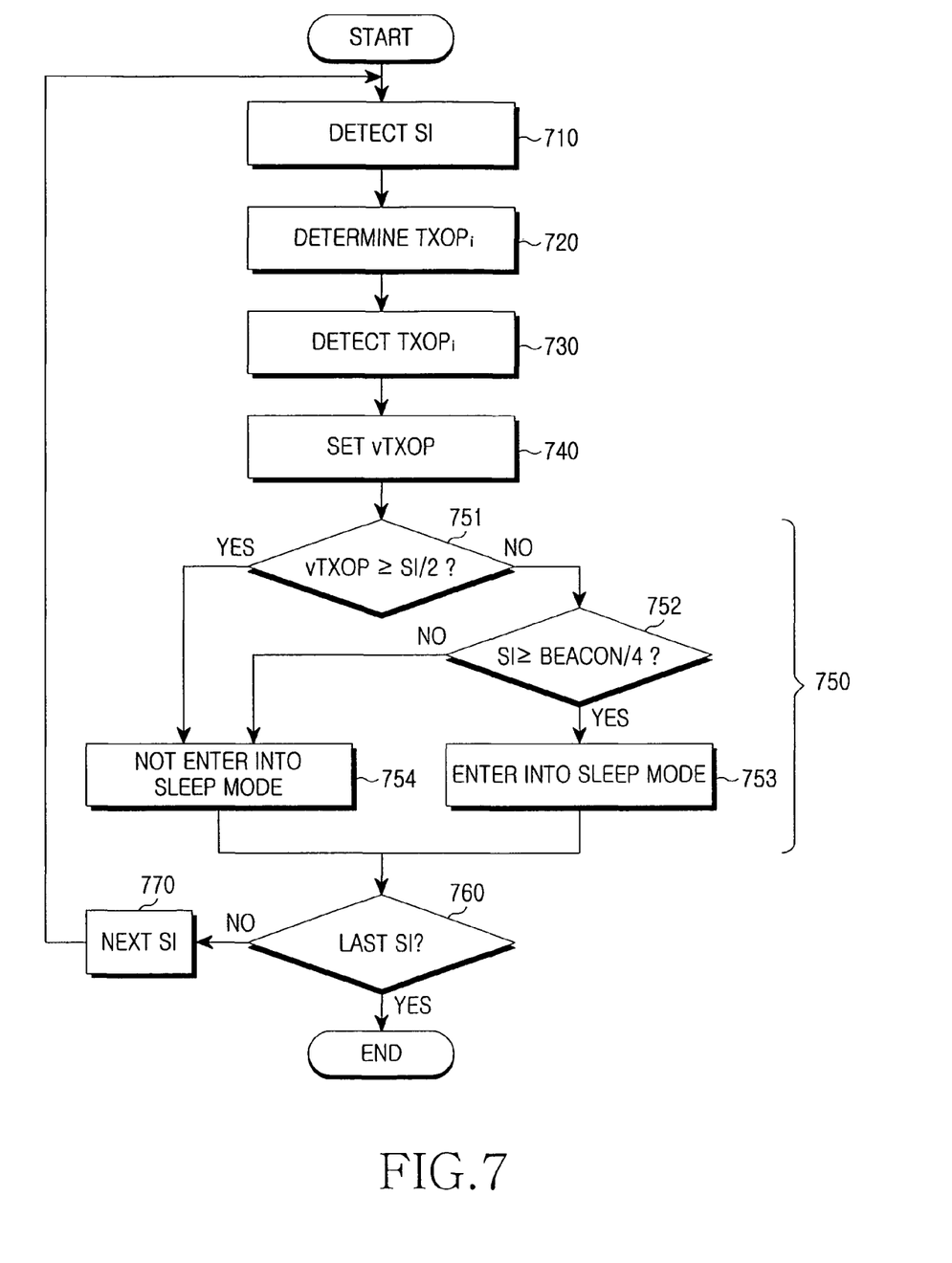
FIG. 7 is a flowchart illustrating a power saving operation using a TXOP map according to an exemplary embodiment of the present invention.

FIG. 7 is a flow chart illustrating an exemplary operation for determining whether to enter into the sleep mode in the power saving controlling system illustrated in FIG. 6.

Referring to FIG. 7, the SI detector 610 detects the start point of an SI in step 710 as described with reference to FIG. 6. The TXOPi decider 620 determines individual TXOPs by listening to an ADDT signal in step 720. In step 730, the TXOPi detector 630 detects individual TXOPs within an SI among the individual TXOPs. The vTXOP setter 640 sets a vTXOP as described with reference to FIG. 4 in step 740 and the sleep mode entry decider 650 determines whether to enter into the sleep mode by comparing the vTXOP with an SI-based value in step 750. Specifically, the sleep mode entry decider 650 compares the vTXOP with SI/2 in step 751 and goes to step 752 or 754 depending on the comparison result. If the vTXOP is shorter than SI/2, the SI is compared with beacon interval/4 in step 752 and enters into the sleep mode in step 753 or not in step 754 depending on the comparison value. For details, refer to FIG. 5. After step 753 or 754, it is determined whether the current SI is the last one in step 760. If there still remains any SI, the system returns to step 710 through step 770 and repeats the procedure of using a TXOP map for the next SI. The detection of the last SI is carried out when a plurality of SIs exist and the present invention is directed not to how many SIs exist but to setting of a vTXOP in an SI. Therefore, steps and devices associated with the SI detection are not characteristic of the subject matter of the present invention and will not be described in detail.

In accordance with an exemplary embodiment of the present invention as described above, the conventional power saving method is efficiently improved, and may be improved simply with a software modification without the need for using additional hardware. Therefore, the whole system lifetime is lengthened in the wireless mesh network, and a sleep mode controlling method and system for power saving can be provided in the wireless mesh network seeking energy efficiency.

Certain exemplary embodiments of the present invention can also be embodied as computer-readable codes on a computer-readable recording medium. The computer-readable recording medium is any data storage device that can store data which can thereafter be read by a computer system. Examples of the computer-readable recording medium include, but are not limited to, read-only memory (ROM), random-access memory (RAM), CD-ROMs, magnetic tapes, floppy disks, optical data storage devices, and carrier waves (such as data transmission through the Internet). The computer-readable recording medium can also be distributed over network-coupled computer system so that the computer-readable code is stored and executed in a distribute fashion. Also, functional programs, codes, and code segments for accomplishing the present invention can be easily construed as within the scope of the invention by programmers skilled in the art to which the present invention pertains.

While the invention has been shown and described in the context of an IEEE 802.11e wireless mesh network, it can be determined whether to enter into sleep mode according to a TXOP map according to the present invention in any wireless mesh network using individual TXOPs. Hence, it will be understood by those skilled in the art that various changes in form and details may be made therein without departing from the spirit and scope of the invention as defined by the appended claims.

What is claimed is:

1. A method of controlling a sleep mode to save power in a wireless mesh network, the method comprising:
   determining individual transmission opportunities (TXOPs);
   detecting individual TXOPs within a service interval (SI) among the determined individual TXOPs;
   setting a virtual TXOP (vTXOP) starting from a start point of the SI and ending at the end of the last of the detected individual TXOPs; and
   determining whether to enter into a sleep mode by comparing the vTXOP with an SI-based value, so as to enter into the sleep mode between the individual TXOPs based on the comparison,
   wherein the determining whether to enter into the sleep mode comprises determining not to enter into a sleep mode if the vTXOP is equal to or longer than SI/2, and determining to enter into the sleep mode if the vTXOP is shorter than the SI/2 and the SI is equal to or longer than (beacon interval)/4.

2. The method of claim 1, wherein the determining the individual TXOPs comprises determining by listening to an add traffic stream (ADDT) signal during communications between nodes.

3. The method of claim 1, further comprising detecting the SI within a beacon interval to be used for communications.

4. The method of claim 1, wherein the vTXOP comprises at least one of a distributed vTXOP and a long vTXOP.

5. The method of claim 2, wherein the ADDT listening is broadcast listening.

6. The method of claim 2, wherein the ADDT listening is unicast overhearing.

7. A system for controlling sleep mode to save power in a wireless mesh network, comprising:
   an individual transmission opportunity (TXOP) decider for determining individual TXOPs;
   an individual TXOP detector for detecting individual TXOPs within a service interval (SI) among the determined individual TXOPs;
   a virtual TXOP (vTXOP) setter for setting a vTXOP starting from the start point of the SI and ending at the end of the last of the detected individual TXOPs; and
   a sleep mode entry decider for determining whether to enter into the sleep mode by comparing the vTXOP with an SI-based value, so as to enter into the sleep mode between the individual TXOPs based on the comparison,
   wherein the sleep mode entry decider determines not to enter into a sleep mode if the vTXOP is equal to or longer than SI/2, and determines to enter into the sleep mode if the vTXOP is shorter than the SI/2 and the SI is equal to or longer than (beacon interval)/4.

8. The system of claim 7 wherein the TXOP decider determines individual TXOPs by listening to an add traffic stream (ADDT) signal during communications between nodes.

9. The system of claim 7, further comprising an SI detector for detecting the SI within a beacon interval to be used for communications.

10. The system of claim 7, wherein the vTXOP comprises at least one of a distributed vTXOP and a long vTXOP.

11. The system of claim 7, wherein the ADDT listening comprises broadcast listening.

12. The system of claim 7, wherein the ADDT listening comprises unicast overhearing.

13. A computer readable medium having stored thereon instructions for executing a method of controlling a sleep mode to save power in a wireless mesh network, the instructions comprising:
   a first set of instructions for determining individual transmission opportunities (TXOPs);
   a second set of instructions for detecting individual TXOPs within a service interval (SI) among the determined individual TXOPs;
   a third set of instructions for setting a virtual TXOP (vTXOP) starting from a start point of the SI and ending at the end of the last of the detected individual TXOPs; and a fourth set of instructions for determining whether to enter into a sleep mode by comparing the vTXOP with an SI-based value, so as to enter into the sleep mode between the individual TXOPs based on the comparison, wherein the fourth set of instructions comprises determining not to enter into a sleep mode if the vTXOP is equal to or longer than SI/2, and determining to enter into the sleep mode if the vTXOP is shorter than the SI/2 and the SI is equal to or longer than (beacon interval)/4.

* * * * *